Patented Jan. 17, 1939

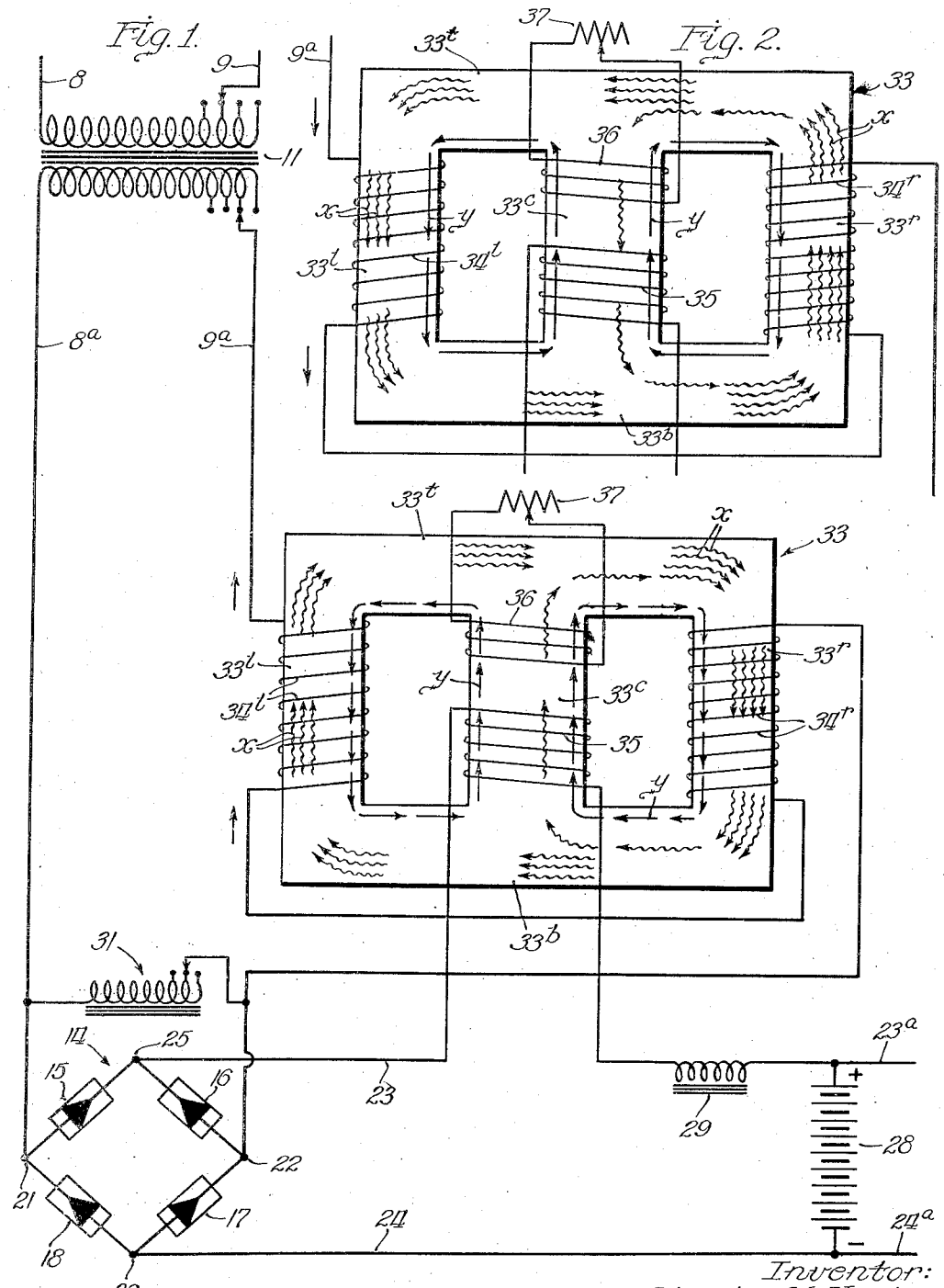

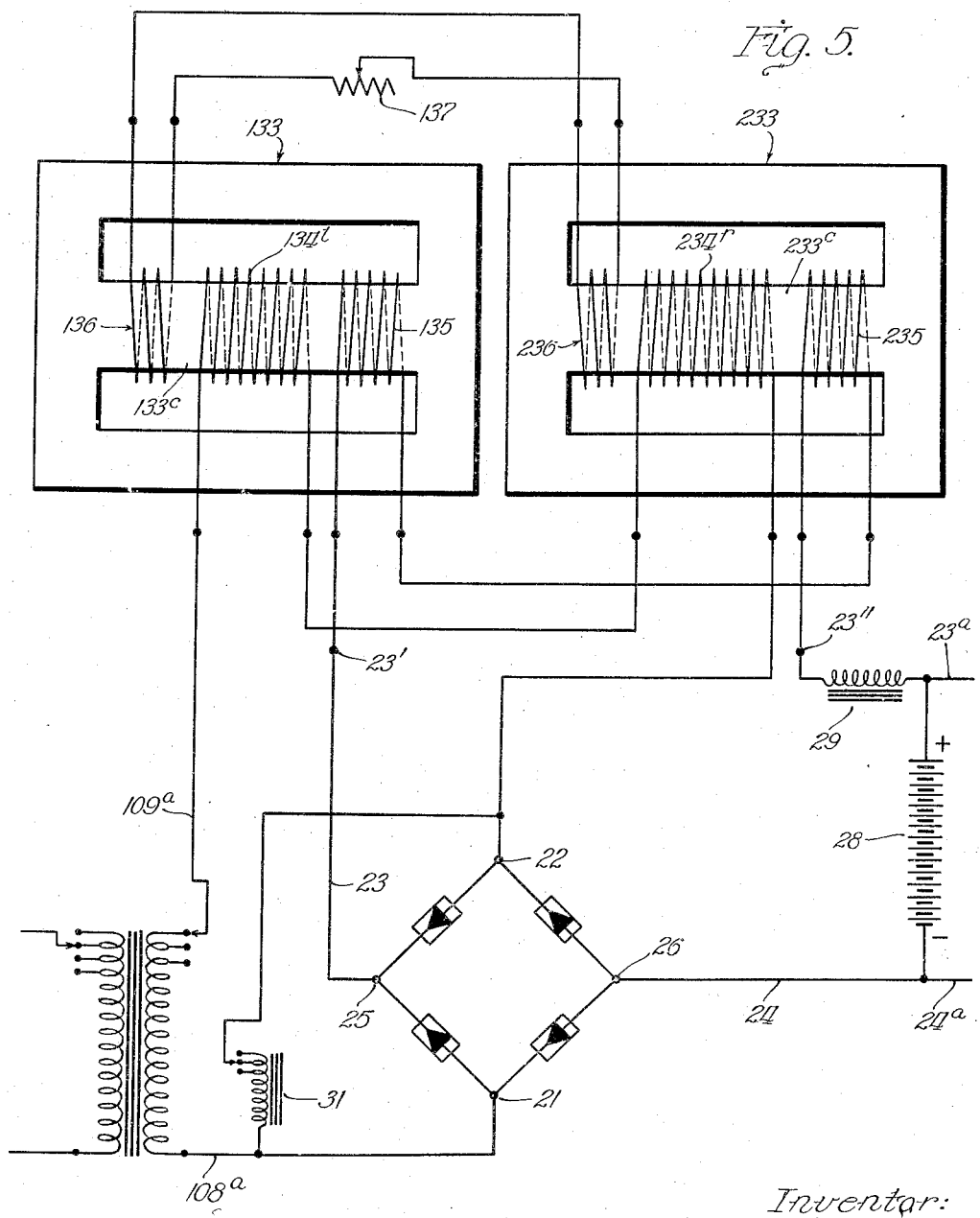

2,144,289

UNITED STATES PATENT OFFICE 2,144,289

AUTOMATIC REGULATING APPARATUS FOR CURRENT SUPPLY SYSTEMS

Stanley M. Hanley, Detroit, Mich., assignor of one-half to The North Electric Manufacturing Company, Galion, Ohio, a corporation of Ohio, and one-fourth to Donald R. Middleton, Detroit, Mich.

Application August 26, 1935, Serial No. 37,797

8 Claims. (Cl. 175—363)

The present invention relates to automatic regulating apparatus for current supply systems.

The general object of the invention is to provide an improved system and apparatus which will function in response to different load demands on a load circuit to control automatically the voltage of an alternating current supply circuit. The invention has particular application to rectifying systems wherein the alternating current of the supply circuit is rectified for the load circuit, as for example in battery charging systems and in battery eliminator systems.

The regulating function is performed by varying the magnetic permeability in a reactor comprising a multiple leg core structure which carries windings energized by the alternating current of the supply circuit and by the direct current of the load circuit. Another object of the invention is to provide improved means for controlling the flow of the alternating current fluxes in said core structure and for effecting an improved correlation of the fluxes therein to secure the desired potential control in the supply circuit.

The invention is of important practical utility in connection with isolated automatic telephone exchanges or any type of load which requires direct current for intermittent duty operation. Such a load, particularly in the case of a telephone system, may vary widely, as from substantially no load during certain parts of the night to a maximum for the busiest hours of the day or evening. A direct current supply system under such circumstances must accommodate itself not only to the load but also to the characteristics of the battery. Such isolated telephone stations have no person in attendance and only periodical inspection, as, for example, monthly, the attendant inspects the condition of the cells and supplies any necessary make-up water. For such requirements, it is necessary that the rate of recharging the battery be reduced to such a value that gassing is a minimum. A certain amount of gassing is desirable to stir up the electrolyte so that it does not stratify, but any excessive gassing which would only waste water is to be avoided. The characteristics of the system should therefore be such as to allow the battery to assist in supplying the demand for peak loads, but on the other hand, the rectifier must cut in and recharge the battery as soon as peak loads are passed and then cut out or substantially cease charging as the battery becomes substantially fully charged. The system of the present invention accomplishes the above and other purposes in a highly satisfactory manner.

Other objects and advantages of the invention will appear from the following detail description of two preferred embodiments thereof. In the accompanying drawings illustrating these embodiments:—

Figure 1 is a diagrammatic view of the improved apparatus and system of the invention;

Figure 2 is a diagrammatic view of the reactor showing the relation of the fluxes therein during the other alternation in the alternating current supply circuit;

Figure 5 is a diagrammatic view of a modified form of the invention.

Figure 3:
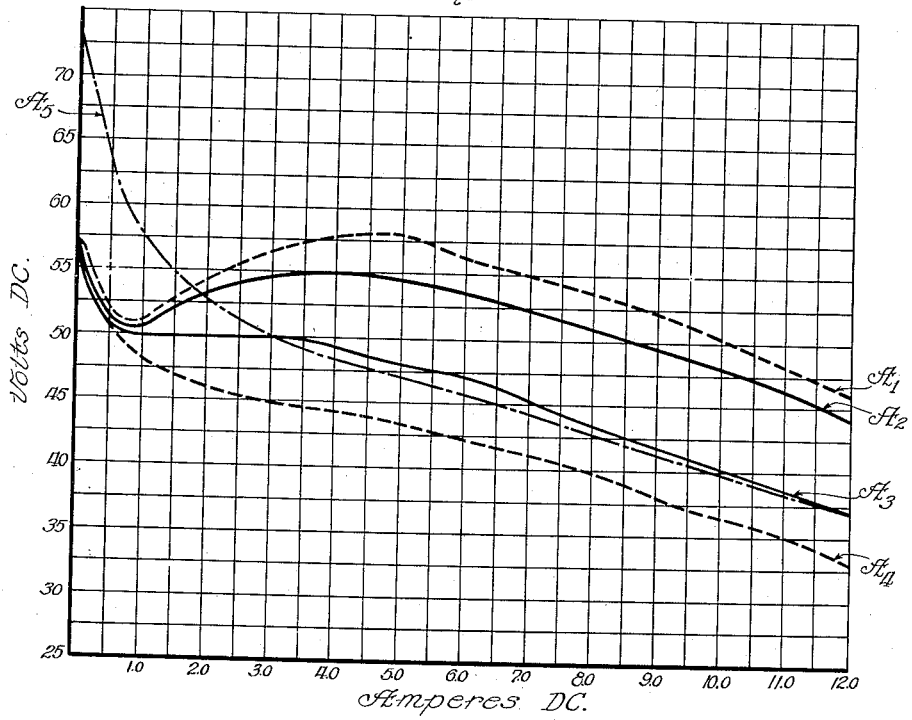
Figures 3 and 4 show characteristic curves of the regulating performance of the apparatus.

The conductors 8 and 9 represent an alternating current supply circuit of commercial frequency. A transformer 11 is preferably interposed in this supply circuit for voltage adjusting purposes, the primary and secondary windings of said transformer preferably having appropriate taps to enable the proper adjustment to be made between line voltage and the voltage impressed on the rectifying apparatus 14. Conductors 8a and 9a represent a continuation of the supply circuit from the secondary of transformer 11 to said rectifying apparatus. If desired, the latter may comprise high vacuum rectifying tubes, or gas filled rectifying tubes, although for simplicity of illustration I have shown the rectifying apparatus as comprising copper oxide rectifying elements. These are preferably of the well known copper-oxide-and-copper, dry disc type appropriately arranged in the four arms 15, 16, 17 and 18 of a bridge, so as to give full wave rectification. The supply circuit 8a, 9a is connected with the input terminals 21, 22 of this bridge. The load circuit 23, 24 is connected with the output terminals 25 and 26 of this bridge. The load circuit is shown as serving to charge a storage battery 28, the apparatus being of particular advantage in this regard for telephone exchanges, direct current signaling systems, etc. In this embodiment, the battery is connected by the leads 23a and 24a to a telephone exchange. Such exchange may be an isolated automatic telephone exchange having no attendants and being given only periodical inspection, as, for example, once a month. It will, of course, be understood that any similar load may be employed instead of the telephone system. A conventional ripple suppressing choke 29 is preferably included in series in the load circuit. Should it be desired to use the apparatus in the capacity of a battery eliminator, the load circuit will include any suitable filter system.

A shunt impedance 31 is connected across the supply circuit 8a—9a, preferably at a point between the variable reactor and the input terminals 21, 22 of the rectifying bridge. This impedance may be inductive, capacitive or resistive, or any combination thereof, although I preferably employ an inductive reactance, as shown. The latter may be provided with taps for adjusting purposes.

The variable reactor, designated 33, comprises a core structure including a left leg 33l, a right leg 33r and center leg 33c, these three legs being joined by top and bottom yoke portions 33t and 33b. Two alternating current windings 34l and 34r are mounted on the end legs 33l and 33r, and a direct current winding 35 is mounted on the center leg 33c. The two alternating current coils are connected in series in the supply circuit 8a—9a, and the direct current coil is connected in series in the load circuit 23, 24. The two alternating current coils are connected in series and are wound so that the fluxes created by both coils circulate in the same direction through the core structure. The alternating current fluxes created by these alternating current coils are indicated by the wavy arrows designated x, and the direct current flux created by the direct current coil is indicated by the straight arrows designated y. Figure 1 illustrates the alternating current fluxes x flowing in a clockwise direction through the two end legs during one alternation or half cycle, and Figure 2 illustrates these fluxes flowing in the reverse or counterclockwise direction during the next alternation or half cycle. The direct current flux y always flows in the same direction through the center leg 33c, in the arrangement illustrated this being upwardly in said center leg.

In the preferred form of the invention I purposely establish an unbalanced relation between the alternating current fluxes x created by the left and right alternating current coils 34l and 34r. This is preferably accomplished by having one of the coils establish a higher magneto motive force than the other, as by having more turns in one coil than in the other; although it will be understood that substantially the same unbalanced relation might be obtained by having one of the end legs of the core of higher magnetic reluctance than the other end leg, such as by constructing it of smaller cross-sectional area. In the preferred construction using an unbalanced relation between the coils, I find that the best results are obtained when the turn ratio of coils 34l and 34r is approximately in the order of 8 to 10, although it will be understood that the invention is not limited to this approximate ratio.

One of the important effects of this unbalanced relation is the tendency to cause a circulation of alternating current flux x through the central leg 33c of the reactor. The amount of such flux passing through the central leg is arranged to be controlled by a low resistance coil 36 mounted on the central leg. The ends of this coil are connected to an adjustable resistance 37. Reducing the effective resistance of said coil, for a greater current flow therethrough, reduces or minimizes the flow of alternating current flux through the central leg, and, conversely, increasing the effective resistance of said coil, increases the amount of alternating current flux passing through the central leg. This action is caused by the different values of current that flow through the coil 36 as controlled by the resistance 37. Thus, when the resistance 37 is short circuited, a large current flows in the coil 36, setting up a flux opposing that which creates it. Conversely, when all of the resistance 37 is inserted, the current flowing in the coil 36 is relatively small and less opposing flux is generated thereby. Accordingly, when the coil 36 is short circuited, the amount of alternating flux threading the middle leg 33c is at a minimum and the amount of alternating current induced in the direct current winding 35 is correspondingly at a minimum. It will then be noted that the coil 36 and resistance 37 are effective to control the amount of alternating current induced in the winding 35 and also the range of operation and effective impedance of the reactor 33.

Referring now to the regulating function of the control device 33, it will be seen that the direct current flux or unidirectional flux y created by the direct current coil 35 will divide in the core structure, part flowing through the left leg 33l and part through the right leg 33r. The low resistance winding 36 will have substantially no effect on this unidirectional flux. It will be noted that when the alternating current flux x is flowing in the clockwise direction illustrated in Figure 1, the direct current flux y is opposing the alternating current flux in the left leg 33l and is aiding the alternating current flux in the right leg 33r. Conversely, when the alternating current flux is flowing in the counterclockwise direction illustrated in Figure 2, the direct current flux is aiding the alternating current flux in the left leg 33l and is opposing the alternating current flux in the right leg 33r. The fact that there is an unbalanced distribution of the alternating current flux between the two outside legs apparently causes an unbalanced distribution of the direct current flux between these two outside legs, particularly under transient conditions, as, for example, when the demand in the load circuit varies.

As previously described, the unbalanced relation of the two alternating current coils 34l and 34r establishes a magneto-motive force tending to cause alternating current flux to pass through the central leg 33c of the core structure. When the alternating current flux is flowing in the clockwise direction illustrated in Figure 1, the portion of this flux that passes through the central leg flows in an upward direction therein. Conversely, when the alternating current flux is traveling in a counterclockwise direction, as illustrated in Figure 2, such portion of this flux as passes through the central leg flows downwardly therein. The amount of alternating current flux traversing this central leg can be adjusted by changing the resistance of the resistance element 37. This variable resistance provides for fine adjustment of the degree of influence of the control device in the alternating current circuit. By varying said resistance, the high light-load impedance of the control device is varied as well as its low full-load impedance. This provides a simple practical control for adjusting the control device to cooperate with the other parts of the circuit and to allow for commercial variations in choke coils, transformers, and rectifying elements.

In order not to minimize the high control ratio of the control device 33, the special shunt impedance 31 is provided in the preferred embodiment of the invention. For a proper understanding of the function of this shunt impedance, consideration should be given to the characteristics of the rectifying bridge 14. Let us neglect at first the non-linear characteristics of the rectifying elements and assume that for forward currents they act like fixed resistances, but that for back voltages they are perfect insulators. The impedance across the input terminals of the bridge is then somewhat like that of a neon lamp, being infinite for voltages less than the battery voltage and being a fixed low resistance in series with a back electromotive force for higher voltages. The equivalent impedance would be a pure resistance whose value varied with the voltage. Now consider the series combination of the control device 33 and the rectifying bridge 14 without the shunt choke 31. The desired effect of the control device 33 is to increase the potential across the rectifying bridge when higher current is delivered to the battery, so as to compensate for the resistance of the rectifier bridge. To do this, the control device 33 must be reduced in impedance at the time of increased rectifier output. But at this very time, the bridge circuit, as viewed from its input terminals, will be markedly reduced in impedance as compared with its normal, no-load impedance. Therefore, to attain even zero control, the control device 33 must vary in impedance proportionately to the bridge. A very great variation will then be required to attain the desired control. To permit the available variation in the series control device 33 to be efficiently employed in reducing the ordinary positive, resistive, voltage regulation of the battery charger, the shunt impedance 31 is, in accordance with this invention, connected in parallel with the rectifying bridge 14. The parallel combination so formed is much more stable in impedance than the bridge alone. The control device 33 is now in series with that whole parallel combination, and can therefore exert a very great degree of control over the input voltage applied to the bridge. According to the preferred embodiment of the invention, the stabilizing shunt 31 comprises an inductive impedance. This brings the total impedance of the controlled branch more nearly into phase with the impedance of the control device 33. Also, this type of impedance, being mostly reactive, wastes very little power. Taps are preferably provided on said shunt reactor 31 to furnish a convenient means for varying the degree of control. It should be noted that the changing of these reactor taps varies not only the amount of control, but also the working voltage applied to the bridge. However, the provision of the taps on the secondary of the transformer 11 provides for a separate adjustment of this voltage.

The above function of control device 33 is the same for any rectifier having low no-load losses. That is, the rectifier input impedance is very high when no current is being delivered to the direct current output circuit.

Shunt impedance 31, under the alternating current voltage variations across terminals 21 and 22 as the load changes from zero to full output, undergoes an impedance variation of 3 to 1 or the impedance for light loads or no load is approximately three times full load impedance.

Coil 36 has an additional function to perform when the output terminals of the rectifying apparatus are connected to a filter system with its associated filter condensers. Without winding 36 it is possible, and also occurs on all types of rectifiers when connected with a regulating reactor and filter system, that at certain loads the direct current output voltage and current will oscillate at a definite frequency and thus render the operation of the unit unstable and unusable for this particular load. It is necessary, to prevent such oscillation, either to add a bleeder load which is sufficient to prevent the unit from operating in this unstable range, or to add winding 36 and resistor 37 and adjust the value of 37 so that unstable operation does not occur at any point. This unstable operation is a result of the magnetic coupling between coils 34l and 34r and coil 35, and also the storing of energy in the condensers associated with the filter circuit.

The curves of Figure 3 were taken on a circuit as shown with constant primary voltage and with all other values of the circuit constant except as noted. These curves were taken on a typical automatic battery charger. For battery eliminator circuits and for other applications, it is often desirable to have much less variation in the load voltage as the current output is varied.

Curves $A_1$, $A_2$, $A_3$, and $A_4$ show variations in output for different values of resistance 37.

Curve $A_1$ was taken with choke coil 36 shorted with a jumper.

Curve $A_2$ was taken with resistance 37 set at 0.35 ohms.

Curve $A_3$ was taken with resistance 37 set at 2.0 ohms.

Curve $A_4$ was taken with resistance 37 set at 80.0 ohms.

Removal of the shunt impedance 31 and with the resistance 37 set at 80.0 ohms gives a voltage current curve $A_5$ which has considerable more variation between no load or light loads and full load than a rectifier without control.

Curves $A_1$, $A_2$, $A_3$ and $A_4$ illustrate the value of the control exercised by the choke coil 36 in this charging unit.

Curve $A_2$, or a curve which would fall between $A_2$ and $A_3$, or for some applications curve $A_1$, represent cases of automatic battery chargers.

Figure 4:
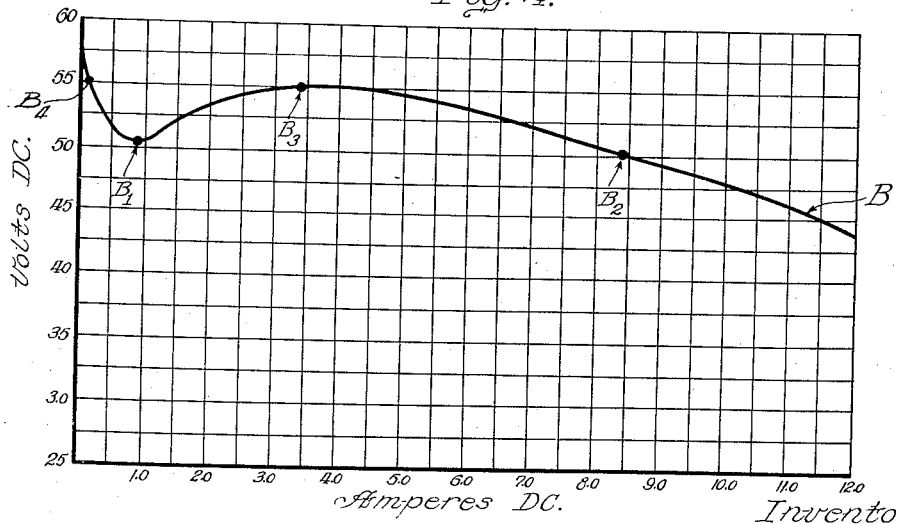

Curve B, Figure 4, is the characteristic curve of a 24 lead cell battery charger which is automatically controlled by the variation in permeability of reactor 33 and its associated controls such as the variable resistor 37 and shunt impedance 31. The operation of this charger has a resultant effect on the battery which is equal to or better than if the charge had been controlled by highly sensitive voltage relays and their associated marginal contacts.

Curve B has two voltage points which are of particular interest, i. e., the voltage at which the battery starts to take charge and the voltage at which the battery takes the minimum charge. By inspection of curve B it will be noted that at any voltage between 55 volts and 50.5 volts, but not including these end points, the battery can have three charging rates as determined by drawing a line, from a particular voltage point, parallel to the current axis. On further observation it will be noted that the only points that have only two charging rates will be the low point $B_1$ and the maximum point $B_3$. These two points $B_1$ and $B_3$ represent the battery voltage at which the charge will be started and terminated. For example when the battery is discharged to a voltage equal to point $B_1$, the rectifier charging rate increases from its initial value at $B_1$ to a maximum value of $B_2$. As the battery voltage increases the output moves along the voltage curve from point $B_2$ to point $B_3$, and since point $B_3$ has two current values, a slight variation in line voltage or a small increase in battery voltage, due to a continued charge at the rate indicated by $B_3$, will cause the charge to decrease to point $B_4$ which has the same voltage as $B_3$ but a charging current of approximately 5% of $B_3$ or the minimum charging rate of the equipment.

When the battery is discharged from point $B_4$ to $B_1$ the above cycle repeats.

The two "switching" points are proportional to alternating current line voltage. A 2% increase in the line voltage would mean that the charging would start when the battery voltage was 2% higher and the charge terminated at a 2% higher voltage. This variation in line voltage serves a useful purpose of equalizing charges and is of decided value for keeping the battery in the best condition.

The shunt impedance 31 effects a decided improvement in the regulating performance of the apparatus. In the absence of such shunt impedance, it is obvious that the regulating reactor would have substantially no magnetization or only a very feeble magnetization during intervals when the load circuit was drawing no current or only a relatively feeble current. Under these circumstances, the reactor is not as responsive to relatively quick changes in load demands, a lag being introduced when attempting to build up the flux quickly from an extremely low value to a relatively high value. However, when the shunt impedance 31 is provided, the appreciable current flow therethrough at all times maintains the flux in the reactor at a substantial working value, even though no current is being drawn through the load circuit. Thus, there is a minimum lag when increasing the flux density from this constantly maintained working value. Moreover, the constancy or uniformity of regulation under the same changes of load conditions is also improved when the flux in the reactor is continuously maintained at a substantial working value during no load or light load conditions. Rapidity and uniformity of regulation are of particular importance in battery eliminator sets where the load is of a character that requires a quickly or widely changing rate of current flow.

It will be noted that the location of the shunt impedance 31 on the input side of the rectifying bridge prevents any drain of rectified load current through this impedance. Thus, in a battery charging installation, should there be a failure of the source of power supply over a substantial time interval, the battery cannot lose its charge by discharging back through the shunt impedance.

The shunt impedance greatly improves the shape of the regulating curve at the no-load or light-load end. It avoids the objectionable rise of voltage at this end of the curve, characteristic of prior battery eliminators of this general type.

The shape of the curve from the light load portion through the cut-off point and through maximum load portion can be varied as desired by changing the value of the resistor 37 connected to the choke coil 36.

In order to more clearly explain the novel functioning of my invention the following explanation is offered. It is desired to control the voltage applied to the rectifier 14 in such manner that it will begin to charge the battery 28 as soon as its voltage decreases to a predetermined voltage, as indicated at $B_1$ on the curve shown in Figure 4, below the fully charged voltage condition. As this low voltage condition is approached, more charging current flows from the rectifier 14, as indicated by this curve. At the same time the alternating current flowing to the rectifier 14 from the alternating current source increases, and the voltage across the alternating current terminals 21—22 of the rectifier decreases, due to the impedance drop through the variable reactor 33. If the direct current winding 35 were not provided on the variable reactor 33, then the alternating current voltage applied to the rectifier 14 would continue to decrease, with a corresponding decrease in the direct current voltage thereof. However, the voltage is caused to rise, since the compounding action of the direct current winding 35 begins to be effective and, as a result, the effective impedance of the variable reactor 33 is decreased to such an extent that a sufficiently high alternating current voltage is applied to the alternating current terminals 21—22 of the rectifier 14 to charge the battery 28 at the maximum rate. As it becomes fully charged the effective impedance of the variable reactor 33 is increased, due to the decrease in flow of direct current through the direct current windings thereon, until a point $B_3$ is reached at the fully charged voltage condition of the battery 28 when the current supplied by the rectifier 14 is less than that required to maintain a voltage on the rectifier which is greater than the battery voltage. The charging current then drops to the minimum value $B_4$ and this condition is maintained until the battery voltage again decreases to the point where the foregoing cycle will be repeated.

In Figure 5 I have shown a modified construction using two core structures as the regulating reactor, which core structures are separated magnetically but are connected in parallel relation electrically. The two core structures 133 and 233 are preferably of the three-legged type, although other forms of closed core structures can be used in this embodiment. One alternating current coil 134*l* is wound on the center leg 133c of the core 133, and the other alternating current coil 233r is wound on the center leg 233c of the other core 233. These two coils are preferably unbalanced as previously described; for example, the turn ratios of coils 134*l* and 234r is preferably in the approximate ratio of 8 to 10. These two alternating current coils are connected in series and are included in the supply circuit 108a and 109a substantially as previously described.

The direct current coil is separated into two sections 135 and 235, both mounted on the center legs of the core structures and both connected in series with each other and with the load circuit 23, 24.

These two direct current coils are so related to the alternating current coils 134*l* and 234r that a minimum induced potential will result between the two points 23' and 23" of the load circuit when the alternating current coils are energized.

The choke coil is likewise separated into two sections 136 and 236, both mounted on the center legs of the core structures and both connected in series with each other and with the adjustable resistor 137, and phased in the same manner described above of the direct current coils. Adjustment of the resistance 137 varies the current in both coils and varies the amount of coupling between the two structures.

The shunt impedance 31 is connected across the input terminals of the rectifying bridge 14, and in other respects the circuit arrangement is the same as in Figure 1.

The same general theory of operation previously described applies to this embodiment, with the possible exception that the two short-circuited coils or choke coils 136 and 236 perform a coupling function in this embodiment, as well as the function previously described. This embodiment may also be used as a battery eliminator.

In each of the above described embodiments, I preferably connect the regulating reactor and the rectifying apparatus directly in the same circuit as shown, with no transformer interposed between the two. In this manner I minimize the included reactance, thereby reducing reactance lag and improving the time factor of the apparatus. The time factor may be a very critical matter in some battery eliminator installations supplying current to teletype machines and like high speed apparatus where the current impulses may reach a frequency of several hundred per second.

While I have illustrated and described what I regard to be the preferred embodiments of my invention, nevertheless it will be understood that such are merely exemplary and that numerous modifications and rearrangements may be made therein without departing from the essence of the invention.

I claim:—

1. In apparatus of the class described, the combination with an alternating current supply circuit and a direct current load circuit, of rectifying apparatus connecting said circuits, and a regulating reactor for varying the impedance of said supply circuit under the influence of current changes in the load circuit, said reactor comprising a core including two end legs and a central leg, alternating current coils on each of said end legs connected in series in said supply circuit, one of said coils having a greater number of turns than the other coil for creating an unbalanced condition of alternating current fluxes in the end legs of said core, a direct current coil on the central leg of said core traversed by current from said load circuit, a choke coil of relatively low resistance on said central leg for restricting the flow of alternating current flux through said central leg, and a shunt impedance connected across the input terminals of said rectifying apparatus.

2. In apparatus of the class described, the combination with an alternating current supply circuit and a direct current load circuit, of rectifying apparatus connecting said circuits, and a regulating reactor for varying the impedance of said supply circuit in response to changes of current flow in the load circuit, said reactor comprising a core including two end legs and a central leg, alternating current coils on each of said end legs connected in series in said supply circuit, one of said coils having a greater number of turns than the other coil for creating an unbalanced condition of alternating current fluxes in the end legs of said core, a direct current coil on the central leg of said core traversed by current from said load circuit, and a choke coil of relatively low resistance on said central leg for restricting the flow of alternating current flux through said central leg.

3. In apparatus of the class described, the combination with an alternating current supply circuit and a direct current load circuit, of rectifying apparatus connecting said circuits, and a regulating reactor for varying the impedance of said supply circuit in response to changes of current flow in the load circuit, said reactor comprising a core including two end legs and a central leg, alternating current coils on each of said end legs connected in series in said supply circuit, one of said coils having a greater number of turns than the other coil for creating an unbalanced condition of alternating current fluxes in the end legs of said core, a direct current coil on the central leg of said core traversed by current from said load circuit, and a shunt impedance connected across the input terminals of said rectifying apparatus.

4. In apparatus of the class described, the combination with an alternating current supply circuit and a direct current load circuit, of rectifying apparatus connecting said circuits, and a regulating reactor for varying the impedance of said supply circuit in response to changes of current flow in the load circuit, said reactor comprising a core including two end legs and a central leg, alternating current coils on each of said end legs connected in series in said supply circuit, one of said coils having a greater number of turns than the other coil for creating an unbalanced condition of alternating current fluxes in the end legs of said core, and a direct current coil on the central leg of said core traversed by current from said load circuit.

5. In apparatus of the class described, the combination with an alternating current supply circuit and a direct current load circuit, of rectifying apparatus connecting said circuits, and a regulating reactor for varying the impedance of said supply circuit in response to changes of current flow in said load circuit, said reactor comprising a magnetic core, a coil on said core connected in series circuit relation between one terminal of said rectifying apparatus and one terminal of said supply circuit through which alternating current flows from said supply circuit to said rectifying apparatus, a coil on said core included in said load circuit, a choke coil of relatively low resistance on the same part of said core as said coil included in said load circuit for restricting the flow of alternating current flux through said latter part of the core, and a shunt impedance connected across the input terminals of said rectifying apparatus.

6. In combination, an alternating current supply circuit, a direct current load circuit, rectifying apparatus connecting said circuits, and a regulating device responsive to the load of said load circuit for varying the impedance of said supply circuit, said regulating device comprising a magnetic core, two coils on said core energized by the alternating current of said supply circuit, one of said coils having a greater number of turns than the other coil for creating an unbalanced condition of alternating current fluxes in different parts of said core, and a direct current coil on said core energized by the direct current of said load circuit.

7. In combination, an alternating current supply circuit, a direct current load circuit, a rectifying bridge, the arms of which include copper oxide rectifying elements, said supply circuit being connected with the input terminals of said bridge, said load circuit being connected with the output terminals of said bridge, a regulating device responsive to the load of said load circuit for varying the impedance of said supply circuit, said regulating device comprising a magnetic core having two end legs and a central leg, an alternating current winding on each of said end legs, said windings being connected in series in said supply circuit and both windings creating alternating current fluxes circulating in the same direction in said core, one of said windings having a larger number of turns than the other for creating an unbalanced condition of alternating current fluxes in the end legs of said core, a direct current coil on the central leg of said core connected in series with said load circuit, a choke coil of relatively low resistance on said central leg for restricting the flow of alternating current flux through said leg, and a shunt impedance connected across the input terminals of said rectifying bridge.

8. In combination, an alternating current supply circuit, a direct current load circuit, rectifying apparatus connecting the two circuits, regulating apparatus comprising two magnetic core structures, alternating current coils on said core structures connected in series with each other and with said supply circuit, direct current coils on said core structures connected in series with each other and with said load circuit, and choke coils establishing a coupled relation between said core structures and controlling the permeability of said core structures.

STANLEY M. HANLEY.